United States Patent [19]

Kelley et al.

[11] Patent Number: 5,683,600

[45] Date of Patent: Nov. 4, 1997

[54] GAS TURBINE ENGINE COMPONENT WITH COMPOUND COOLING HOLES AND METHOD FOR MAKING THE SAME

[75] Inventors: James George Kelley, California, Ky.; Todd Jay Rockstroh, Maineville, Ohio

[73] Assignee: General Electric Company, Cincinnati, Ohio

[21] Appl. No.: 38,338

[22] Filed: Mar. 17, 1993

[51] Int. Cl.$^6$ .................................................. B23K 26/00
[52] U.S. Cl. ........................... 219/121.71; 219/121.72
[58] Field of Search ..................... 219/121.67, 121.71, 219/121.72

[56] References Cited

U.S. PATENT DOCUMENTS

| | | | |
|---|---|---|---|
| 3,265,855 | 8/1966 | Norton | 219/121.72 |
| 3,440,388 | 4/1969 | Otstot et al. | 219/69 |
| 3,531,205 | 9/1970 | Nussmeier | 356/121 |
| 3,534,462 | 10/1970 | Cruickshank et al. | 29/471.1 |
| 3,588,439 | 6/1971 | Heller et al. | 219/121 |
| 3,633,126 | 1/1972 | Martin et al. | 331/94.5 |
| 3,657,510 | 4/1972 | Rothrock | 219/121 LA |
| 3,742,182 | 6/1973 | Saunders | 219/121 LM |
| 3,901,596 | 8/1975 | Vincent et al. | 356/4 |
| 3,935,545 | 1/1976 | Campillo et al. | 331/94.5 C |
| 3,981,565 | 9/1976 | Karasawa | 350/266 |
| 4,093,353 | 6/1978 | Lang | 350/313 |
| 4,125,757 | 11/1978 | Ross | 219/121.71 |
| 4,128,752 | 12/1978 | Gravel | 219/121 L |
| 4,131,782 | 12/1978 | Einstein et al. | 219/121.71 |
| 4,135,787 | 1/1979 | McLafferty | 350/294 |
| 4,156,124 | 5/1979 | Macken et al. | 219/121 L |
| 4,219,721 | 8/1980 | Kamen et al. | 219/121 LM |
| 4,250,374 | 2/1981 | Tani | 219/121 LE |
| 4,260,251 | 4/1981 | Conrad | 356/121 |
| 4,262,186 | 4/1981 | Provancher | 219/121 LH |
| 4,319,122 | 3/1982 | Pope et al. | 219/121 LC |
| 4,324,972 | 4/1982 | Furrer et al. | 219/121 FS |
| 4,328,410 | 5/1982 | Slivinsky et al. | 219/121 LJ |
| 4,467,171 | 8/1984 | Ramos | 219/121 LG |
| 4,480,168 | 10/1984 | Cielo et al. | 219/121 L |
| 4,681,396 | 7/1987 | Jones | 350/96.18 |
| 4,734,550 | 3/1988 | Imamura et al. | 219/121.6 |
| 4,737,613 | 4/1988 | Frye | 219/121 LN |
| 4,739,148 | 4/1988 | Kawazu et al. | 219/121.6 |
| 4,762,464 | 8/1988 | Vertz et al. | 416/121.72 |
| 4,808,785 | 2/1989 | Vertz et al. | 219/121.72 |
| 4,873,414 | 10/1989 | Ma et al. | 219/121.7 |
| 4,977,575 | 12/1990 | Ortiz | 372/103 |
| 5,043,553 | 8/1991 | Corfe et al. | 219/121.7 |
| 5,117,087 | 5/1992 | Baker et al. | 219/121.71 |
| 5,222,617 | 6/1993 | Gregory et al. | 219/121.71 |

FOREIGN PATENT DOCUMENTS 0028789   7/1980   Japan.

OTHER PUBLICATIONS

G. Wise, "Lasers, An Exploration Continues", R&D Frontiers, Spring 1990, pp. 14–16, G.E. Corp. R&D Center, Schenectady, NY.

*Primary Examiner*—Michael J. Carone
*Attorney, Agent, or Firm*—Andrew C. Hess; Nathan D. Herkamp

[57] ABSTRACT

A gas turbine engine component includes a wall portion with at least one compound cooling hole formed therein between an external surface of the component and an interior plenum. The at least one compound cooling hole includes a non-circular diffuser opening formed by a laser beam with a non-circular cross-sectional area, and a channel with a substantially circular cross-section connecting the diffuser opening and the interior plenum. The channel is also formed by the non-circular laser beam in the same laser drilling operation as the diffuser opening. The cooling hole further includes a transition point at which the compound hole begins to convert from a substantially non-circular cross-section to a substantially circular cross-section. The location of the transition point is controlled by positioning a focal point of the non-circular laser beam to undershoot the external surface of the component by a predetermined distance.

8 Claims, 2 Drawing Sheets

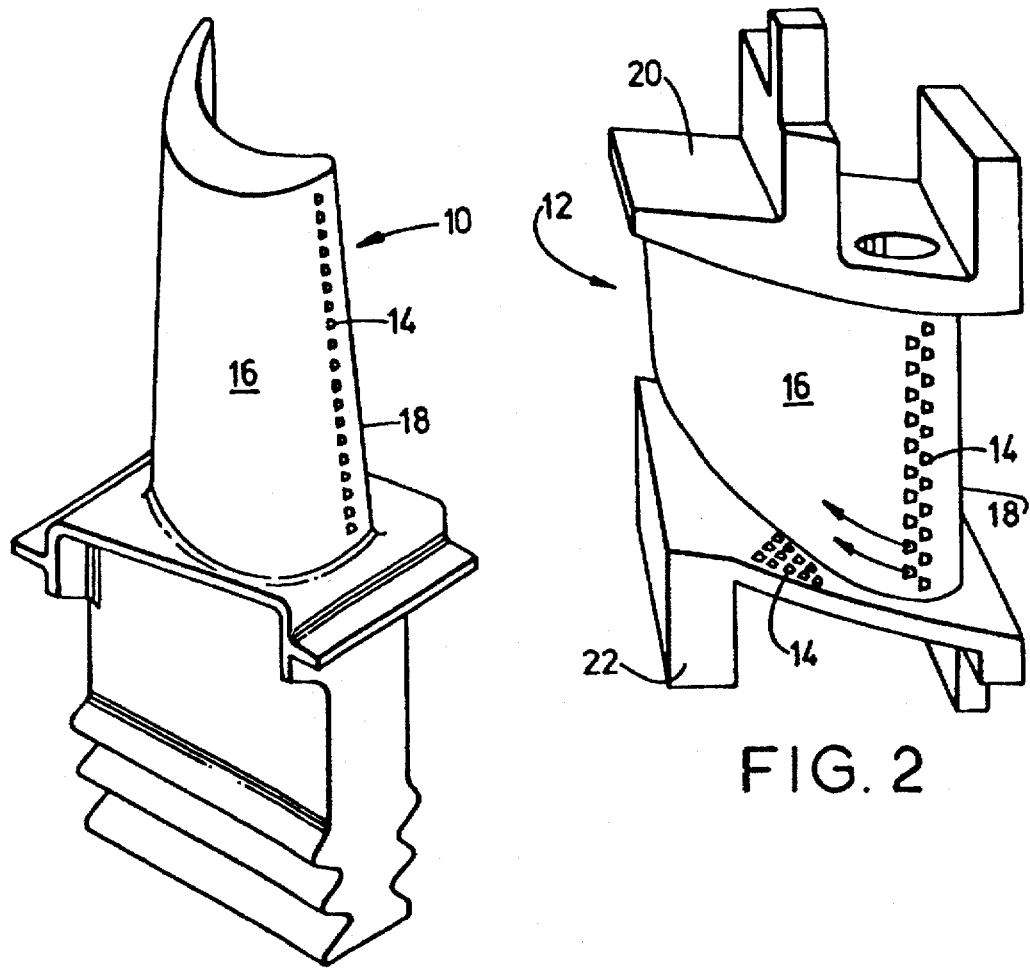
FIG. 1
FIG. 2
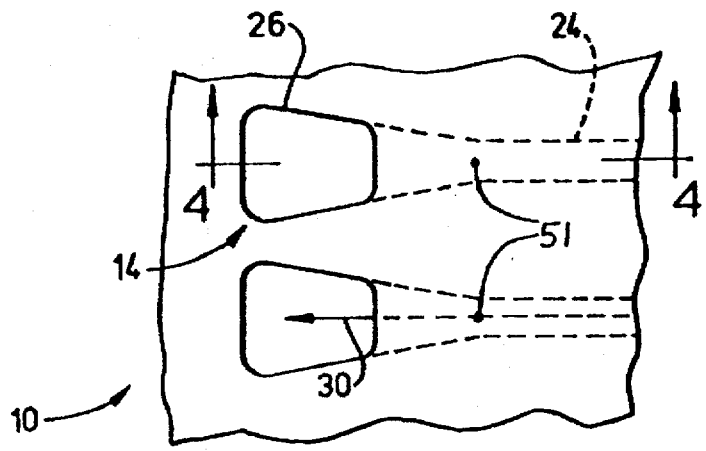
FIG. 3

GAS TURBINE ENGINE COMPONENT WITH COMPOUND COOLING HOLES AND METHOD FOR MAKING THE SAME

BACKGROUND OF THE INVENTION

The present invention relates to manufacturing gas turbine engine components and, more particularly, to drilling a compound cooling hole through the surface of a gas turbine engine component using only a laser beam in a single laser drilling operation.

In some manufacturing processes, there is a need to form a hole or via opening having a shape other than circular. One example for the need of a shaped opening is in the formation of cooling holes in the components of a gas turbine engine, such as the airfoil-shaped blades of the rotors, vanes of the stators and the like.

Extremely high temperature and high velocity gases are produced in the combustor portion of a gas turbine engine; these gases are ducted upon the blades of a turbine rotor to cause rotation of the rotor and are redirected by the stator vanes onto additional rotor blades to produce more work. Because of the high heat of the gases, it is desirable to cool the blades and vanes to prevent damage and to extend the useful life of these engine components.

A commonly used method for cooling a turbine blade or vane is to duct cooling air through the internal passages of a hollow blade or vane and then vent the cooling air through a plurality of holes formed in the component; the holes are typically formed uniformly along a line substantially parallel to the leading edge of the airfoil and at a selected distance from the leading edge to provide a film of cooling air over the convex side of the airfoil when the cooling air escapes through the openings during engine operation. Other rows of cooling holes or vents, or an array of openings may be formed in the blade and vane components of a rotor or stator depending upon design constraints.

To facilitate the distribution of the cooling air substantially completely over the convex and concave surfaces of the blade airfoil or platform, the hole openings are preferably shaped like a trapezoid with the downstream portion of each hole opening, at the airfoil surface, flaring or widening relative to the narrower upstream portion of each hole opening. The increasing cross-sectional area of the hole opening functions as a diffuser to reduce the velocity of the cooling airstreams exiting the holes; the lower velocity airstreams are more inclined to cling to the blade surface for improved cooling rather than separate from the blade.

One method and apparatus for forming a shaped cooling hole in an airfoil, similar to that described above, is disclosed in U.S. Pat. No. 4,808,785 to Vertz et al. Vertz discloses basically a two step process using Electron Discharge Machining (EDM) and laser drilling; an EDM step is performed to create the diffuser-shaped hole opening on the airfoil surface and a laser drilling step is performed to penetrate through the airfoil and into the hollow interior of the blade. The entire process is independent of which step is performed first. This two step process typically takes longer than if the hole with a diffuser-shaped opening could be formed in substantially a single hole drilling or forming operation.

The electrodes for an EDM process are typically ganged for more efficient operation with as many as five or more electrodes forming a comb-like structure; thus about five (5) holes may be formed at a time with the process time being about fifteen (15) minutes to form the trapezoid-shaped hole opening. The EDM electrodes are typically copper and very delicate; they can bend or deflect easily and may, therefore, become misaligned. Machining a turbine blade with a misaligned electrode can destroy the blade. Additionally, the EDM electrode is eventually consumed after repeated machining operations, necessitating its replacement; this replacement further slows the EDM process.

In some stator vane component designs, it may be desirable to form cooling holes in other portions of the vane component, in addition to the airfoil portion, such as the inner and outer base or buttress portions of the vane component. Some locations on these vane portions may be inaccessible for machining using convention EDM processes.

Another method and apparatus for forming a shaped cooling hole in a blade or vane component of a gas turbine engine is disclosed in pending U.S. patent application Ser. No. 06/565,508, filed Dec. 27, 1983, entitled Laser Intensity Redistribution, assigned to the same assignee as the present application and incorporated herein in its entirety by reference. This application discloses directing a laser light beam, from a ruby laser, through a shaped aperture to shape the cross-sectional area of the beam. The aperture will pass a laser light beam having a cross-sectional area shaped substantially like that of the aperture and, depending upon the location of the focal point of a focusing lens positioned between the aperture and a workpiece, an opening will be formed in the workpiece which is also shaped substantially like the aperture. The size of the opening will be a function of the focal length of the focusing lens and the position of the workpiece relative to the focal point of the lens. Different shaped apertures may be mounted in a turret and the turret may be rotated to select the desired aperture and beam cross-section.

The apertures and turret represent an additional optical component required in this system to form the shaped holes in a workpiece. Proper alignment of the laser beam and the aperture are necessary to avoid loss of power density and reflection of the beam back into the lasing system which could result in damage to the laser. To avoid this condition, the aperture is mounted in the turret by a cylindrically-shaped support member; the interior wall of the support member must be conically formed or tapered toward the shaped aperture to refract the laser beam portion incident upon the support member wall toward the aperture rather than reflect the beam back toward the lasing system, resulting in loss of power density for drilling and possible damage to the laser. The aperture and support member may also be made from a material which would absorb the laser light rather than reflect it.

It is accordingly a primary object of the present invention to provide a novel method for drilling shaped or compound holes in a workpiece which is not subject to the foregoing disadvantages.

It is another object of the present invention to provide a method that permits drilling a shaped or compound cooling hole in a single laser drilling operation.

It is a further object of the present invention to form a compound cooling hole through the surface of a gas turbine engine component using only a laser beam and thereby eliminating the need for an EDM operation.

These and other objects of the invention, together with the features and advantages thereof, will become apparent from the following detailed specification when read with the accompanying drawings.

SUMMARY OF THE INVENTION

In accordance with the present invention, a gas turbine engine component includes a wall portion with at least one compound cooling hole formed therein between an external surface of the component and an interior plenum. The compound cooling hole includes a non-circular diffuser opening formed by a laser beam with a non-circular cross-sectional area, and a channel with a substantially circular cross-section connecting the diffuser opening and the interior plenum. The channel is also formed by the non-circular laser beam in the same laser drilling operation as the diffuser opening. The cooling hole further includes a transition point at which the compound hole begins to convert from a substantially non-circular cross-section to a substantially circular cross-section. The location of the transition point is controlled by positioning a focal point of the non-circular laser beam to undershoot the external surface of the component by a predetermined distance.

In accordance with the present invention, a method for drilling a compound hole in a gas turbine engine component includes the steps of: providing a laser beam with a non-circular cross-sectional area; directing the laser beam upon the component surface at a selected angle of incidence relative to a line tangent to the component surface to form a non-circular diffuser opening in the surface of the component; continuing to direct the laser beam through the diffuser opening to drill completely through a wall of the component to an interior plenum; and controlling a transition location at which the compound hole begins to change from a substantially non-circular cross-section to a substantially circular cross-section by positioning a focal point of the laser beam to undershoot the component surface by a predetermined distance.

BRIEF DESCRIPTION OF THE DRAWINGS

FIG. 1 is a perspective view of a rotor blade of a gas turbine engine with cooling holes formed therein in accordance with the present invention.

FIG. 2 is a perspective view of a vane of a gas turbine engine with cooling holes formed therein in accordance with the present invention.

FIG. 3 is a detailed plan view of the cooling holes of either FIG. 1 or FIG. 2 formed in accordance with the present invention.

DETAILED DESCRIPTION OF THE PREFERRED EMBODIMENTS

Figure 4:
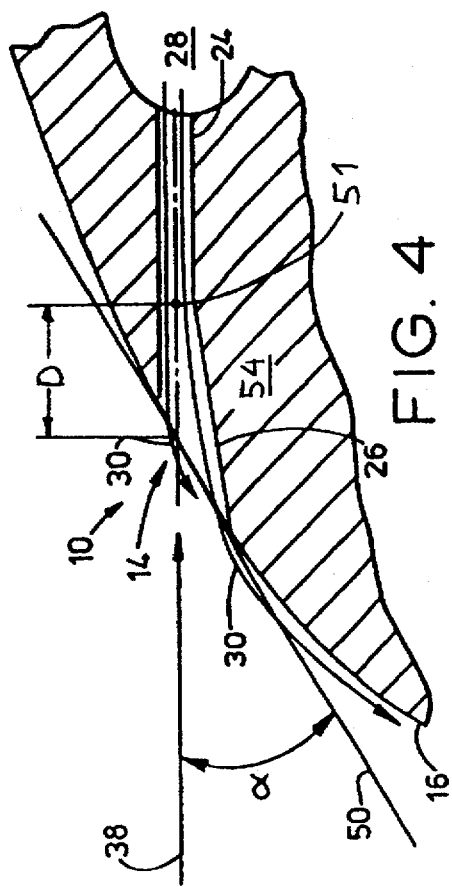
FIG. 4 is a cross-sectional view of a cooling hole in FIG. 3 taken along line 4—4.

One example of the application of a precisely drilled and shaped hole is in the components of a gas turbine engine. FIG. 1 shows a single rotor blade 10 and FIG. 2 shows a single vane 12, both of which may be generically referred as an airfoil and are components of a gas turbine engine (not shown). Both components are subjected to extremely high heat because high velocity hot gases are ducted from the engine's combustor (not shown) onto the blades and vanes as the gases pass through the engine to produce work by rotating the engine's rotors. The extreme heat can damage these engine components and shorten their useful lives. The airfoils of the blades and vanes are typical hollow for weight reduction and shaped cooling holes 14 are preferably formed on the convex side 16 of the airfoils forming blades 10 and vanes 12 as shown in FIGS. 1 and 2 respectively. Shaped cooling holes 14 are formed at locations on blades 10 and vanes 12 to provide optimum cooling of the engine component and to avoid or minimize deterioration of the component. Holes 14 are preferably formed proximate to the airfoil leading edge 18 and on the inner and outer bases 20 and 22 or buttresses of vanes 12 (FIG. 2). Holes 14 may also be formed in a selected pattern or array to provide optimum cooling as shown in FIG. 2.

A plan view of a portion of the airfoil of FIG. 1 showing cooling holes 14 in detail is depicted in FIG. 3. Cooling hole 14 may be described as a compound hole having an upstream portion 24 (shown in phantom in FIG. 3) and a downstream portion 26. Referring to FIG. 4, the upstream portion 24 defines a channel which communicates with the hollow interior 28 or plenum of the airfoil 10 and downstream portion 26 is formed substantially in the convex exterior surface 16 (FIGS. 1 and 2) of the airfoil; thus, referring to FIGS. 3 and 4, cooling air in the airfoil interior 28 is forced, during operation of the gas turbine, through upstream portion 24 to downstream portion 26 and out the opening of hole 14 on convex surface 16 as shown by arrows 30. Upstream portion 24 is substantially cylindrical or circular in cross-section and downstream portion 26 is substantially trapezoidal in cross-section. As shown in FIGS. 3 and 4, downstream portion 26 flares radially outwardly in the direction 30 of cooling air flow and provides an increasing cross-sectional area as cooling air travels downstream. The increasing cross-sectional area functions as a diffuser which reduces the velocity of cooling airstreams 30 and thereby causes airstreams 30 to cling to the exterior surface 16 for optimum cooling, rather than to separate from the airfoil surface.

Figure 5:
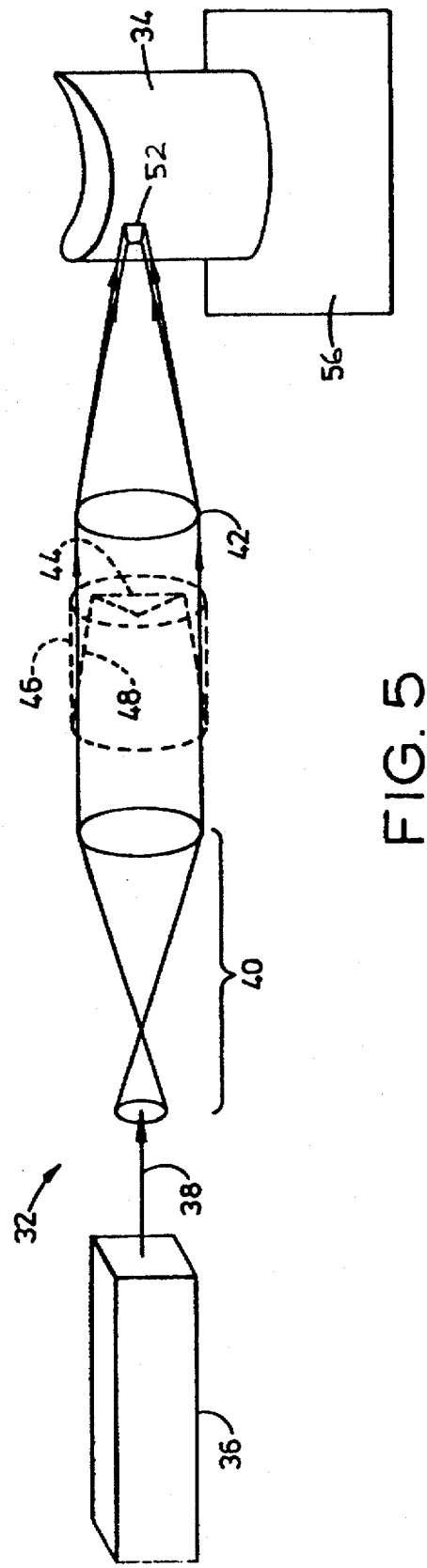
FIG. 5 is a schematic view of a device for drilling a shaped hole in accordance with the present invention.

In accordance with the present invention, a device 32 for drilling compound-shaped holes 14 in a workpiece or airfoil 34 is shown in FIG. 5. Device 32 includes a laser 36 capable of providing a beam 38 with a substantially rectangular shaped cross-section normal to the direction of beam propagation, and a power between about 50 watts and about 1000 watts. Laser 36 is preferably a slab-type laser made from yttrium-aluminum-garnet (YAG) material doped with neodymium. A solid state YAG-type face-pumped laser (FPL) formed with a square or rectangular cross-section will provide a laser light beam with a substantially square or rectangular cross-section without the need for additional optics such as apertures, non symmetric lenses and the like to further shape the beam cross-section. A key feature of the rectangular YAG FPL is its level of beam quality of 7 to 14 mm-mrad (waist X divergence) which provides superior and unexpected results compared to other lasers capable of drilling metals. As described in more detail hereinbelow, the superior beam quality enables drilling a non-circular hole with the beam unfocused to provide a hole of a predetermined size, and the beam quality also enables subsequent control of a transition point where the hole drilled becomes substantially more circular. The size and shape of the non-circular hole will be a function of the beam unfocus and the angle of beam incidence upon the workpiece.

While the present invention has been described using a YAG-type laser, any solid state laser utilizing a slab-like crystal, such as gallium-gadolinium-garnet (GGG), alexandrite, glass and the like, with substantially rectangular or square cross-section beams could be used as well.

In accordance with one embodiment of the present invention, a standard upcollimator 40 having a power of between about 1× and about 10× is disposed in the optical path of laser beam 38 between FPL 36 and workpiece 34. Upcollimator 40 allows selective adjustment of the aspect ratio of the cross-section of beam 38; the size and shape of cooling hole 14 is a function of the aspect ratio of the beam cross-section.

A focusing lens 42 is disposed in the beam optical path between upcollimator 40 and workpiece 34 to converge beam 38 on a selected location on workpiece 34. Lens 42 is preferably a standard spherical element with a focal length between about 50 mm. and about 500 mm.

In accordance with another embodiment of the present invention, a non-symmetric upcollimator may be substituted for standard upcollimator 40 to further adjust the aspect ratio and shape of the cross-section of beam 38. A non-symmetric upcollimator could be used to provide a more oval shaped cross-section beam. The shape of the hole 14 will be responsive to the shape of the cross-section of beam 38 exiting the upcollimator.

In accordance with a further embodiment of the present invention, an aperture 44 (shown in phantom in FIG. 5) may be disposed between upcollimator 40 and focusing lens 42 to further selectively adjust the cross-section of beam 38 if a particularly unique hole shape is desired which can't be achieved with a standard or non-symmetrical upcollimator 40 or other standard optical components. Aperture 44 is preferably mounted on a cylindrically shaped support member 46 with a conically shaped inner surface 48 which tapers toward aperture 44. Conically shaped inner surface 48 refracts the edges of beam 38 toward aperture 44 rather than reflecting the edge portions of the beam back into the lasing system which could damage the system. Apertures mounted on cylindrically shaped support members of this type are described in detail in copending U.S. patent application Ser. No. 07/565,508, assigned to the same assignee as the present application and incorporated herein in its entirety by reference.

Referring back to FIG. 4, with respect to drilling the compound cooling hole 14 in the gas turbine engine airfoil 10, the square or rectangularly shaped beam 38 is projected onto the airfoil surface 16 at a selected angle α relative to a tangent 50 to the surface 16 and a focal point 51 of the lens 42 is positioned to undershoot the airfoil surface 16 a selected distance D to project a beam cross-section 52 (FIG. 5) or footprint on the surface 16 which corresponds to the size and shape of the diffuser opening 26 desired. The selected angle α is preferably between about 20° and about 30° to form a substantially trapezoidally-shaped diffuser opening 26 as shown in FIG. 3. The selected angle of incidence α will cause the power distribution of the rectangular shaped laser beam 38 to correspond to the shape of the diffuser opening 26.

In accordance with the present invention, the focal point 51 of the lens 42 is positioned below or to undershoot the surface 16 the selected distance D to also control the transition location of the compound hole 14. After the substantially trapezoidal-shaped diffuser opening 26 of the compound hole 14 is formed, the square or rectangular cross-section laser beam 38 is further directed through the diffuser opening 26 in the same laser drilling operation with the same laser drilling parameters to continue to drill the cooling hole 14 completely through the wall 54 of the airfoil 10 and into the hollow interior plenum 28. Airfoils used in high performance gas turbine engines, such as those used for aircraft propulsion, are made from high heat and high stress resistant aerospace alloys, such as nickel based alloys, Rene 88, Incoriel 718, single crystal materials, steels, titanium alloys or the like. The conductive and reflective nature of these aerospace alloys and similar materials causes a waveguiding effect to occur to the laser beam 38 and the non-circular cross-section of the laser beam 38 is ameliorated and the hole formed about at and below the beam focal point 51 transitions and becomes substantially more circular in cross-section as the beam 38 continues to drill through the airfoil wall 54 to break through to the interior plenum 28. The location where this transition, from a non-circular hole to a more circular hole, begins to occur is controlled by the location of the focal point 51 beneath the airfoil surface 16. Thus, the compound hole 14, with a trapezoidal shaped diffuser opening 26 and a circular or cylindrically shaped upstream channel portion 24, can be formed completely by laser drilling in a single laser drilling operation without the need for an EDM operation.

After the diffuser opening 26 is formed, the laser beam 38 may be further directed at the same angle of incidence α through the diffuser opening 26 to form the upstream channel portion 24 of the compound hole 14, or the angle of incidence α of the laser beam 38 may be adjusted to drill the upstream portion 24 of the compound hole 14 at a different angle to provide a predetermined slope relative to the exterior surface 16 or the diffuser opening 26, if a particular slope is required or desired to provide improved airflow between the interior plenum 28 and the exterior of the airfoil 10 during engine operation.

The compound cooling hole 14, may also be formed by laser drilling completely through the wall 54 of the airfoil 10 at the desired slope for the upstream portion 24 with the transition between the non circular and circular portions being controlled by the location of the focal point 51 beneath the airfoil surface 16. The square or rectangular shaped beam 38 is then defocused on the airfoil surface 16 to provide a footprint with a power distribution corresponding to the predetermined size and shape of the diffuser opening 26. The hole 14 is then further cleaned out or shaped on the airfoil surface 16 by the unfocused non-circular laser beam 38 to form the trapezoidally shaped diffuser opening 26.

The diffuser opening 26 may be formed by positioning the beam focal point 51 either above or below the exterior surface 16 to defocus the beam 38 on the surface and to provide a resulting footprint 52 corresponding to the predetermined size and shape of the diffuser opening 26. If the diffuser opening 26 is formed first, the beam focal point 51 will have to be repositioned below the airfoil surface 16 to control the transition between the diffuser opening portion 26 of the compound hole 14 and the upstream circular portion 24 to provide proper airflow between the plenum 28 and diffuser opening 26.

During the drilling operation, the airfoil 10 is typically secured in a jig 56 or the like for proper positioning and may be translated during the FPL drilling process to widen or flare upstream portion 26 or to provided the desired slope of the upstream portion 24 through the airfoil wall 54 to improve cooling air flow between the interior plenum 28 and the diffuser opening 26 for optimum airfoil cooling during turbine operation.

About 5 or 6 pulses (each pulse having a power of about 500 watts) at about 5 Hz. to about 10 Hz. from FPL device 32 (FIG. 5) is capable of forming cooling hole 14 (FIGS. 3 and 4) in a gas turbine component made of a nickel-based superalloy and having a thickness of about 2.0 to about 5.0 mm. This single laser drilling operation takes about three seconds which compares favorably to an EDM process where it may take as long as about 15 minutes to form only downstream portion 26 either before or after upstream portion 24 is formed.

It will be readily understood by those skilled in the art that while the present invention was described with respect to forming cooling holes in gas turbine engine components, the present invention may be used in any application where a shaped hole is desired. It is not intended that the present invention be limited to the specific embodiments described and illustrated herein, but different embodiments and adaptations besides those shown herein and described, as well as many variations, modifications and equivalent arrangements will now be apparent or will be reasonably suggested by the foregoing specification and drawings, without departing from the substance or scope of the invention. While the present invention has been described herein in detail in relation to its preferred embodiments, it is to be understood that this disclosure is only illustrative and exemplary of the present invention and is made merely for purposes of providing a full and enabling disclosure of the invention. Accordingly, it is intended that the invention be limited only by the spirit and scope of the claims appended hereto.

What is claimed is:

1. A method for forming a compound cooling hole with a non-circular surface opening in a gas turbine engine component, comprising the steps of:

(a) providing a laser beam with a non-circular cross-sectional area;

(b) directing the laser beam upon the component surface at a selected angle of incidence relative to a line tangent to the component surface to form a non-circular diffuser opening in the surface of the component;

(c) continuing to direct the laser beam through the diffuser opening to drill completely through a wall of the component to an interior plenum; and (d) controlling a transition location at which the compound hole begins to change from a substantially non-circular cross-section to a substantially circular cross-section by positioning a focal point of the laser beam to undershoot the component surface by a predetermined distance.

2. The method of claim 1, wherein the laser beam has a substantially rectangular cross-sectional area to form a substantially trapezoidally shaped diffuser opening with the laser beam.

3. The method of claim 1, further comprising the step of controlling the size and shape of the diffuser opening as a function of the selected angle of incidence of the laser beam and a location of the laser beam focal point.

4. The method of claim 3, wherein said selected angle is between about 20° and about 30°.

5. The method of claim 1, wherein the laser beam is directed through the diffuser opening in step (c) at the same selected angle as step (b).

6. The method of claim 1, wherein the laser beam is directed through the diffuser opening in step (c) at a different angle from the selected angle of step (b) to provide an upstream portion with a predetermined slope relative to the diffuser opening.

7. The method of claim 1, further comprising the steps of selecting the angle of incidence of the laser beam and positioning the focal point of the laser beam to project a laser footprint on the surface having a power distribution corresponding to the size and shape of the diffuser opening.

8. The method of claim 1, wherein the gas turbine engine component is made of a nickel-based alloy.

* * * * *